United States Patent [19]
McDaniel

[11] Patent Number: 5,952,662
[45] Date of Patent: Sep. 14, 1999

[54] HIGH EVENT RATE GAMMA CAMERA

[75] Inventor: David L. McDaniel, Dousman, Wis.

[73] Assignee: General Electric Company, Milwaukee, Wis.

[21] Appl. No.: 09/001,882

[22] Filed: Dec. 31, 1997

[51] Int. Cl.[6] ................................................ G01T 1/208
[52] U.S. Cl. .................................... 250/369; 250/363.09
[58] Field of Search .............................. 250/369, 363.07, 250/363.09, 370.08, 370.1

[56] References Cited

U.S. PATENT DOCUMENTS

| | | | |
|---|---|---|---|
| 4,455,616 | 6/1984 | Inbar ........................................ | 364/527 |
| 4,780,823 | 10/1988 | Stoub et al. ............................. | 250/369 |
| 5,508,524 | 4/1996 | Goldberg et al. ....................... | 250/369 |

OTHER PUBLICATIONS

The Effect of Pixel Geometry On Spatial and Spectral Resolution in a CdZnTe Imaging Array, Eskin, et al., 1995 IEEE Nuclear Science Symposium and Medical Imaging Conference Record, vol. 1, pp. 544–548, Oct. 21–18, 1995

Performance of CdZnTe Coplanar–Grid Gamma–Ray Detectors, IEEE Transactions on Nuclear Science, vol. 43, No. 3, pp. 1481–1486, Jun. 1996, Luke, et al.

*Primary Examiner*—Edward P. Westin
*Assistant Examiner*—Richard Hanig
*Attorney, Agent, or Firm*—Michael A. Jaskolski; Christian G. Cabou; Phyllis Y. Price

[57] ABSTRACT

An apparatus for use with a gamma camera to increase count rate without causing dead time or pile up, the apparatus including a first processor optimized for simplicity and minimum dead time but with moderate to poor spatial resolution for generally determining the impact point of a photon on a scintillation crystal and a second digital processor which uses the general position information from the first processor to identify a subset of PMT intensity signals for further processing to identify the precise impact point location.

11 Claims, 9 Drawing Sheets

HIGH EVENT RATE GAMMA CAMERA

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to gamma cameras generally and more specifically to an apparatus and method for use with a gamma camera for selecting a subset of camera detectors for processing to speed up detector operation and enhance image quality.

Single photon emission computed tomography (SPECT) examinations are carried out by injecting a dilution marker comprising a compound labeled with a radiopharmaceutical into the body of a patient to be examined. A radiopharmaceutical is a substance that emits photons at one or more energy levels. By choosing a compound that will accumulate in an organ to be imaged, compound concentration, and hence radiopharmaceutical concentration, can be substantially limited to an organ of interest. A radiopharmaceutical that emits photons or gamma emissions which are approximately at a single known energy level is chosen. The organ to be imaged will be referred to as an organ of interest and an energy range which approximates the known energy level will be referred to as the marker range.

While moving through a patient's blood stream the marker, including the radiopharmaceutical, becomes concentrated in the organ of interest. By measuring the number of photons emitted from the organ of interest which are within the marker range, organ characteristics, including irregularities, can be identified.

To measure the number of emitted photons, one or more planar gamma cameras are used. After a marker has become concentrated within an organ of interest, a camera is positioned at an imaging angle with respect to the organ of interest such that the organ is positioned within the camera's field of view FOV. The camera is designed to detect photons traveling along preferred paths within the FOV.

A gamma camera consists of a collimator, a scintillation crystal, a plurality of photo multiplier tubes (PMTs) and a camera processor. The collimator typically includes a rectangular lead block having a width dimension and a length dimension which together define the FOV. The collimator block forms tiny holes which pass therethrough defining the preferred photon paths. The preferred paths are unidirectional and perpendicular to the length of the collimator. The collimator blocks emissions toward the crystal along non-preferred paths.

The scintillation crystal is positioned adjacent the collimator on a side opposite the FOV and has an impact surface and an oppositely facing emitter surface. The impact surface defines a two dimensional imaging area A having a length L and a width W. Photons which pass through the collimator impact and are absorbed by the impact surface at impact points. The crystal emitter surface emits light from an emitter point adjacent the impact point each time a photon is absorbed. The amount of light emitted depends on the absorbed photon's energy level.

The PMTs are arranged in a two dimensional array which is positioned adjacent the emitter surface. Light emitted by the crystal is detected by the PMTs which are in the area adjacent the emitter point. Each PMT which detects light generates an analog intensity signal which is proportional to the amount of light detected. When a single photon is absorbed by the crystal, the emitted light is typically absorbed by several different PMTs such that several PMTs generate intensity signals simultaneously. For the purposes of this explanation all intensity signals caused by a single photon will be collectively referred to as a signal set.

The processor receives each signal set and performs a plurality of calculations on each signal set to determine two characteristics of the corresponding photon. First, the processor combines the intensity signals of each signal set to identify the energy level of a corresponding photon. Photons having energies within the marker range will be referred to as events. Only signals corresponding to events are used for imaging. Second, the processor performs a series of calculations in an effort to determine precisely where on the impact surface imaging area A an event occurred. Once impact locations of all events have been identified, the processor uses the impact locations to create an image of the organ of interest which corresponds to the camera imaging angle.

To create a three dimensional image of the organ of interest, a gamma camera can be used to generate a plurality of images from different imaging angles. To this end, the camera is positioned parallel to, and at an imaging angle about, a rotation axis which passes through the organ of interest. The angle is incremented between views so that the plurality of images are generated. The plurality of images are then used to construct pictures of transaxial slices of the torso section using algorithms and iterative methods that are well known to those skilled in the tomographic arts.

With any imaging system there are several different criteria by which to judge system usefulness. Perhaps the two most important criteria for judging system usefulness are imaging speed and the quality of resulting images. For the purposes of this explanation the time required to generate an image at one imaging angle will be referred to as an imaging period and the time required to generate images from several imaging angles to generate a three dimensional image will be referred to as an imaging session.

Imaging speed is important for at least three reasons. First, the likelihood of imaging errors increases as imaging session duration is extended. Ideally imaging should be performed while a patient remains completely still. Patient movement can result in blurred images which are unusable for diagnostic purposes. Patient movement is more likely during extended sessions than it is during abbreviated sessions.

Second, speedy imaging sessions advantageously minimize patient discomfort. Many patients are uncomfortable lying still during long imaging periods. While an extended imaging period at one imaging angle is not extremely burdensome, when images from many different imaging angles are required to generate a tomographic image, the duration of an entire imaging session can prove to be onerous. In these cases, adding even a few seconds to each imaging period to achieve threshold photon levels can increase patient discomfort appreciably.

Third, imaging systems are relatively expensive diagnostic tools and therefore the cost of such systems is usually only justifiable where a large number of patients can be examined each day.

Among other things, image quality is related to the type of processing performed by the camera processor. Generally, gamma camera processors can be divided into two different types, analog and digital. On one hand, analog processors are relatively fast but are only capable of moderate to poor spatial and energy resolution. On the other hand, digital processors are relatively slow but are capable of extremely accurate spatial and energy resolution. Thus, despite speed restrictions, to ensure quality images suitable for diagnostic purposes, most camera processors are of the digital type.

Image quality is also related to the number of photons within the marker energy range which are absorbed by the crystal. Thus, image quality can be increased by either increasing the photon generating intensity of the radiopharmaceutical in the organ of interest or by increasing imaging period durations. Because imaging speed is important, to the extent possible, image quality is increased by increasing photon intensity.

Unfortunately, image quality and imaging speed are limited to a certain extent by camera processor capability. The number of absorbed photons processed by a processor will be referred to as count rate. As with any processor, a camera processor is only capable of performing a maximum number of calculations per second MCPS and therefore can only accommodate a maximum count rate MCR. The MCR can be calculated according to the following equation:

$$MCR = \frac{MCPS}{(\#s)(CPS)} \quad \text{Eq. 1}$$

where #s is the number intensity signals which must be processed for each absorbed photon and CPS is the number of calculations per intensity signal which must be performed to identify both photon energy level and impact point. For example, assuming a PMT array including sixty-three PMTs arranged in nine columns and seven rows, each PMT generating an intensity signal every time a photon is absorbed, #s is sixty-three. Also, assuming a processor having an MCPS of ten million and assuming CPS is 16, according to Equation 1, the MCR would be approximately 10,000 per second (i.e. MCR=10,000,000/(63)(16)).

If the number of absorbed photons per second exceeds the maximum count rate, the processor can experience "pile up" and "dead time" during which data related to some absorbed photons is effectively lost. As the name implies, pile up occurs when a processor cannot process all received signals and therefore must warehouse some of the signals in memory until processor time for processing the warehoused signals can be allotted. In some cases the memory can become full at which time additional received signals can be lost. Dead time results from the processor either failing to recognize essentially simultaneously absorbed photons and ignoring one of the photons or detecting essentially simultaneously absorbed photons but processing light associated with both photons as a single photon thereby causing quantitative errors and image artifacts.

There are several ways to increase maximum count rate MCR and thereby reduce the duration of imaging sessions without reducing image quality. The most obvious way to increase count rate is to provide a more powerful processor (i.e. increase MCPS in Equation 1). Unfortunately this solution is expensive to implement. In addition, in existing systems it would be relatively difficult to accommodate a hardware modification as processors are typically designed to perform specific required functions.

Another solution to increase the maximum count rate is reduce the duration of each PMT intensity signal by using a clipping circuit. U.S. Pat. No. 4,455,616 is exemplary of a signal clipping method. According to most signal clipping methods, after signal intensity corresponding to a single event exceeds a specific threshold energy level, the processor stops integrating light corresponding to the event and begins integrating light corresponding to subsequent events, thus freeing up some processor time. Unfortunately, while signal clipping methods reduce the time required to process intensity signals, these methods do not reduce the number of intensity signals which must be processed for each absorbed photon and thus the effect which these methods can have on count rate is limited. In addition, with signal clipping methods some imaging accuracy is sacrificed.

One other solution for increasing the maximum count rate is to reduce the number of calculations which have to be performed for each absorbed photon (i.e. reduce the denominator in Equation 1). To this end, one particularly advantageous solution to increase count rate has been to reduce the signal subset (i.e. #s in Equation 1) which is processed for each absorbed photon. In other words, assuming once again a PMT array including sixty-three PMTs arranged in nine columns and seven rows, instead of processing all sixty-three intensity signals which result from an absorbed photon, only a subset (e.g. five) of the sixty-three intensity signals are processed to identify photon intensity and impact location.

Generally, the industry has used three different methods for selecting a subset of intensity signals for processing. A first method is to identify intensity signals which have intensities above a threshold intensity level and then to process only the identified signals to determine photon energy level and impact location. For example, where the PMT array consists of sixty-three PMTs, when a photon is absorbed, all sixty-three intensity signals are converted to digital intensity signals. However, perhaps only the five strongest digital intensity signals are processed. This method reduces the number of intensity signals that must be processed, but does not reduce the effects of pile up on required energy and position calculations.

According to a second method, the processor divides the PMT array into first and second equal subsets, the first subset including roughly the left half of the array and the second subset including roughly the right half of the array. A third subset including the PMTs which form approximately the central one half of the PMT array is also earmarked by the processor. During operation, the processor combines digital intensity signals in the first subset and combines digital intensity signals in the second subset generating first and second combined intensity signals. If a combined intensity signal is above a threshold intensity level, a binary logic trigger signal (i.e. a "1") is generated for that subset. The two logic signals are combined to select the intensity signals corresponding to one of the three subsets to process. For example, assuming an array including nine columns of seven PMTs each, the first subset might include columns 1 through 5, the second subset might include columns 5 through 9 and the third subset might include columns 3 through 7. In this case, if the logic signal from the first set is true and the logic signal from the second set is false, signals from the first set are processed. If the logic signal from the first set is false and the logic signal from the second set is true, signals from the second set are processed. If both logic signals are true, signals from the third set are processed. Unfortunately, while this method does reduce the "zone" of PMTs to be processed. It only cuts the number of intensity signals to be processed in half.

A third method for selecting a subset of intensity signals to be processed can reduce the processing zone even further.

U.S. Pat. Nos. 5,508,524 and 5,576,547 are exemplary of this method. According to this third method, digital intensity signals for each PMT are sent to an array of comparators. The largest intensity signal is determined by the comparators and used to determined which subset of intensity signals to process to determine photon intensity and impact location. While this method allows for smaller processing zones than the second method described above, this method requires comparisons between all intensity signals and therefore requires a complex comparator and routing circuit. Furthermore, since the comparison is made between processed intensity signals, an absorbed photon anywhere on the scintillation crystal will cause processing circuits for all of the PMTs to be busy.

In addition to each of the shortcomings identified above, methods which select a subset of intensity signals to process also reduce the accuracy of both energy and position calculations to a degree. In effect, a degree of accuracy is sacrificed for imaging speed. Unfortunately, while less accuracy might be required in some instances to increase imaging speed, it is not required in all instances and might therefore be sacrificed for nothing. For example, while photon absorption rate during one imaging period or at one point during an imaging period might be such that the processor can only process five intensity signals for each absorbed photon, during a subsequent imaging period or at a subsequent point in time during an imaging period, the absorption rate might be less such that all intensity signals corresponding to each absorbed photon could be processed. In these cases, methods which automatically select a small zone of PMTs for imaging needlessly sacrifice image accuracy.

Thus, it would be advantageous to have a method and/or apparatus for use with a gamma camera processor which could facilitate a processor count rate necessary to accommodate absorbed photons while at the same time maintaining the highest possible image quality consistent with the count rate.

BRIEF SUMMARY OF THE INVENTION

The present invention includes a camera processor having two different sets of electronics. A first set of electronics is optimized for simplicity and minimum dead time but with moderate to poor spatial and energy resolution. The first set of electronics generates general position signals indicating the general or rough photon impact location. A second set of electronics, including a selector, receives the general position signals from the first set and uses those signals to select intensity signals which will be subjected to more detailed processing to identify precise photon impact locations. Preferably, the fist set of electronics is analog while the second set is a relatively more accurate set of digital electronics.

One object of the invention is to increase processor count rate by reducing the number of intensity signals which are subjected to detailed processing. It has been recognized that only general impact location data is required to identify an optimal zone of PMT intensity signals for more precise processing. To this end fast analog electronics receive all of the intensity signals and generate rough impact location data corresponding to the entire signal set. Next, digital electronics use the rough data to identify an optimal zone of PMTs including a PMT subset. The subset selected generally includes PMTs within the area proximate the impact point. The intensity signals corresponding to the PMT subset are a signal subset. Once the signal subset is identified, the digital electronics process only intensity signals in the signal subset to determine impact location.

Thus, while the prior art systems described above for selecting a subset of intensity signals for detailed processing each required digital conversion of all PMT intensity signals and then complex digital comparisons, the invention uses relatively fast analog circuitry to identify general impact location and then uses the rough data to identify a relatively small subset of intensity signals for digital conversion and processing.

In addition, it has been recognized that the overall size of the subset can be modified as a function of any of several different intensity signal characteristics to optimize system performance. For example, Equation 1 can be rewritten as:

$$\#s = \frac{MCPS}{(CR)(CPS)} \qquad \text{Eq. 2}$$

where CR is count rate. According to Equation 2, where count rate CR (i.e. the rate of photon absorption) is high, signal #s subset must be relatively small so that all subsets corresponding to absorbed photons can be processed. However, where count rate CR is low, larger signal subsets #s can be used to locate impact locations. In addition, where the combined intensity of all intensity signals corresponding to a single absorbed photon is high, it is likely that a relatively large number of PMTs received substantial amounts of light and therefore the signal subset #s should be relatively large to ensure that all intensity signals which appreciably affect the impact point are included in the subset.

To modify signal subset size, in addition to the first and second sets of electronics, the invention might also include a determiner for determining at least one characteristic of the intensity signals, the selector using the determined characteristic to identify the size of an optimal intensity signal subset prior to identifying the subset. In a preferred embodiment the analog electronic set includes the determiner and the characteristic is the combined intensity of all intensity signals corresponding to an absorbed photon, the combined intensity provided as an analog combined intensity signal. The selector then modifies the signal subset size as a function of the combined intensity signal prior to selecting the subset. The selector preferably includes the determiner.

In another embodiment the determiner includes a count rate meter for counting the number of photons absorbed by the crystal per unit time thereby generating a count rate signal and, the selector increases the number of PMTs in the subset as the count rate increases.

In one other embodiment the determiner is a timer for measuring the time period between consecutive photons absorbed by the crystal generating a time signal and, the selector increases the number of PMTs in the subset as the value of the time signal increases.

The invention also includes a method for use with the circuitry identified above.

Objects, advantages and aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefor, to the claims herein for interpreting the scope of the invention.

DETAILED DESCRIPTION OF THE INVENTION

A. Hardware and Operation

Figure 1:
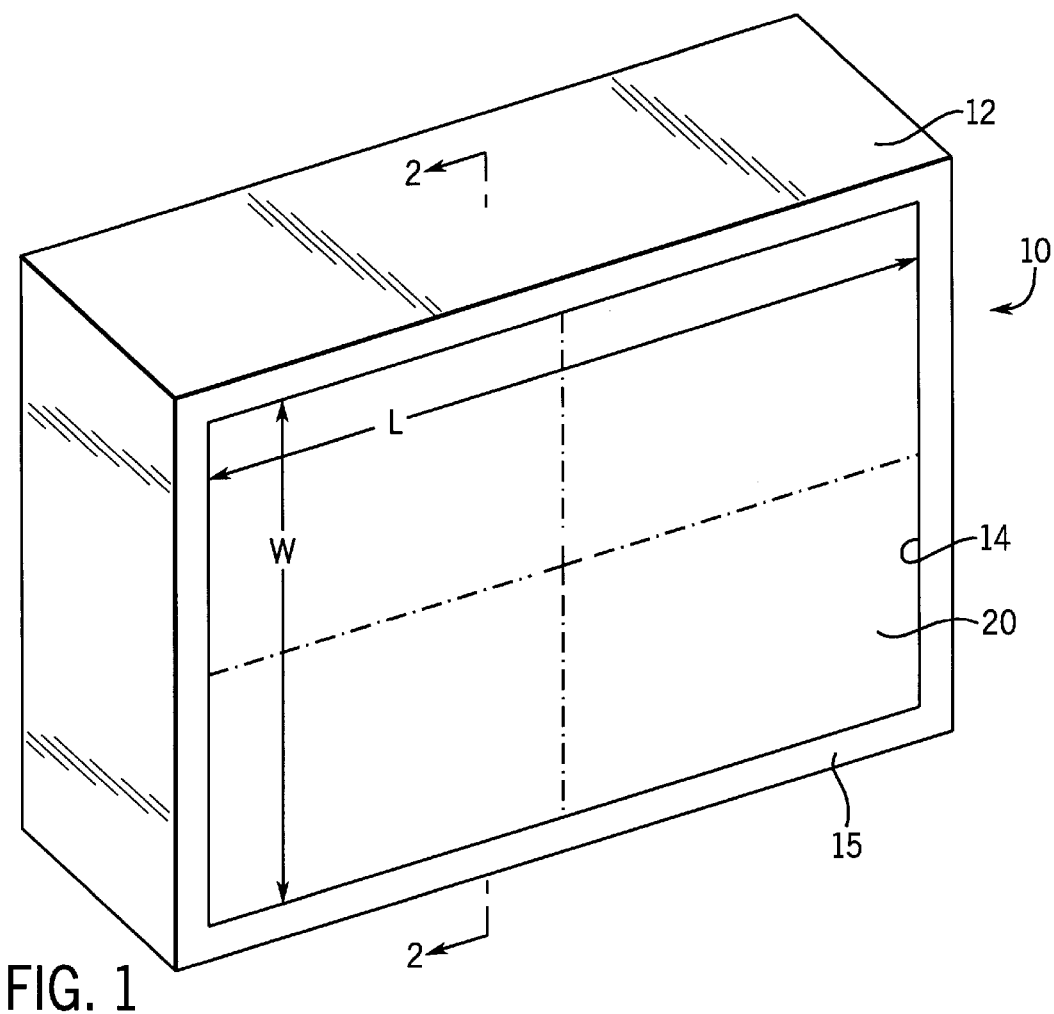
FIG. 1 is a prospective view of a gamma camera.
Figure 2:
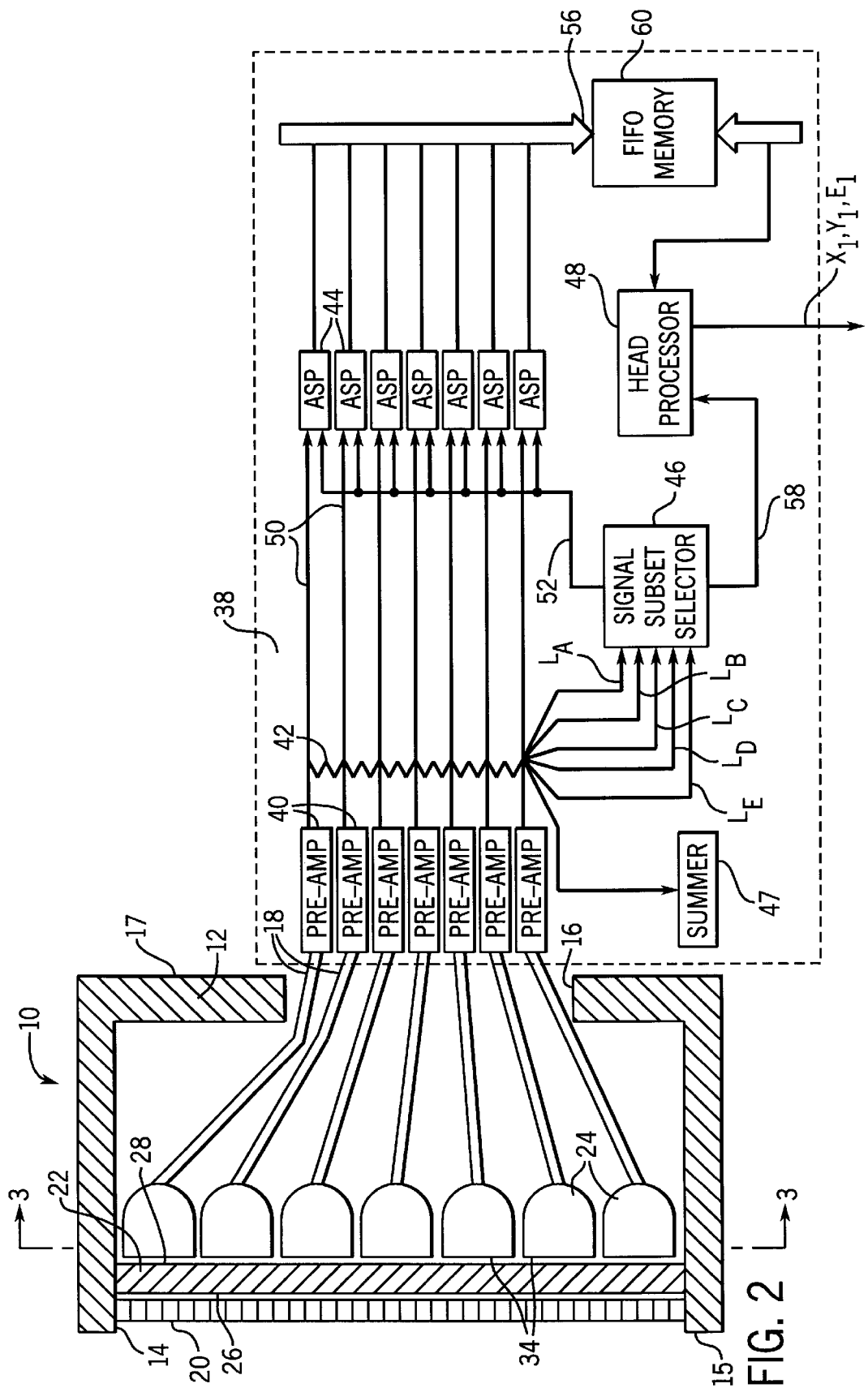
FIG. 2 is a cross-sectional view taken along the line 2—2 of FIG. 1, albeit with the camera linked to processing circuitry configured according to the present invention.

Referring now to the drawings, wherein like referenced characters represent corresponding elements throughout the several views, and more specifically, referring to FIG. 1, therein is illustrated a single gamma camera detector 10 which includes a gamma attenuating boot 12 and a collimator 20. Referring also to FIG. 2, boot 12 defines a collimator receiving opening 14 in a first side 15 and defines an opening 16 in an oppositely facing back-surface 17 to allow data buses collectively referred to by numeral 18 to pass therethrough.

A plurality of detector elements are housed inside boot 12 including collimator 20, a scintillation crystal 22 and a plurality of photo-multiplier tubes (PMTs) collectively referred to by numeral 24.

Collimator 20 is planar having a length L and a width W and is sized such that, when mounted within opening 14, collimator 20 effectively closes opening 14. As well known in the art, collimator 20 forms a plurality of apertures which define preferred photon flight paths passing through collimator 20 perpendicular to both the collimator's length L and width W. Thus, any photons passing through collimator 20 are directed directly at crystal 22.

Referring still to FIG. 2, crystal 22, like collimator 20, is planar and has dimensions (not illustrated) which are essentially identical to length L and width W dimensions. Crystal 22 includes oppositely facing impact and emitter surfaces, 26, 28, respectively. Crystal 22 is mounted inside boot 12 with impact surface 26 facing collimator 20.

Figure 3:
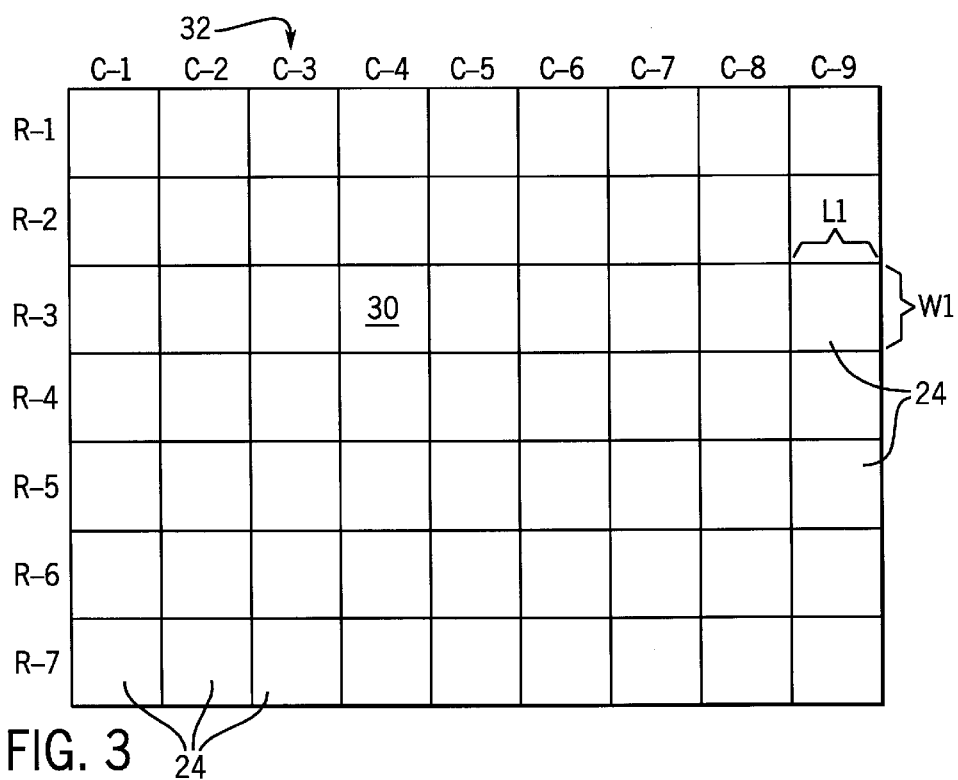
FIG. 3 is a plan view of a photo-multiplier tube array taken along a line 3—3 of FIG. 2.

Referring now to FIGS. 2 and 3, in the interest of simplifying this explanation, it will be assumed that every PMT 24 defines a square detector surface having identical width W1 and length L1 dimensions. It will also be assumed that detector 10 includes sixty-three separate PMTs arranged in nine columns C-1 through C-9 and seven rows R-1 through R-7. Hereinafter, when a specific PMT 24 is referenced, it will be referred to by both its row and column numbers. For example, referring to FIG. 3, the PMT identified by numeral 30 will be referenced as PMT 4-3. While typical PMTs define circular detecting surfaces and PMTs typically are not arranged in perfect rows and columns, the assumptions made herein should simplify this explanation and the explanation should be applicable to more typical PMT array arrangements.

Referring still to FIGS. 2 and 3, PMTs 1-1 through 9-7 are arranged to form a PMT array referred to by numeral 32. Array 32 is mounted inside boot 12 such that the square detecting surfaces collectively referred to by numeral 34 face emitter surface 28 of crystal 22. Each PMT 24 is linked via a unique bus cable 18 to processing electronics as will be explained in more detail below.

In operation, either one or two detectors 10 can be used to generate data for constructing a diagnostic image. When two cameras 10 are used together, typically the two cameras 10 will be positioned on opposite sides of an imaging area such that the cameras 10 oppose each other. Where a single camera 10 is employed, the camera 10 will be mounted in one location with respect to an imaging area.

With a marker, including a radio pharmaceutical, accumulated within an organ of interest (i.e. an organ to be imaged) and with the organ position within the imaging area, photons produced by the radio pharmaceutical radiate from the organ in all directions. Photons directed at collimator 20 and perpendicular to length L of collimator 20 pass through collimator 20 and impact surface 26 of crystal 22. Each photon passing through collimator 20 impacts surface 26 at a specific impact point and is absorbed by crystal 22. When a photon is absorbed by crystal 22 at an impact point, crystal 22 emits light from an emitter point on emitter surface 28. The emitter point is adjacent the photon impact point. Light emitted by crystal 22 is detected by detectors 24, each detector 24 generating an intensity signal which is proportional to the quantum of light detected.

For every absorbed photon, virtually every PMT in array 32 will generate an intensity signal. PMTs 24 which are adjacent to, or relatively close to the emitter point generate relatively high intensity signals while PMTs 24 which are distant from the emitter point generate relatively lower intensity signals. In fact, while some emitted light is typically detected by each PMT 24, essentially all light emitted as a result of an absorbed photon will be sensed by detectors which are located proximate the emitter point. For example, referring specifically to FIG. 3, if an emitter point is centrally located with respect to PMT 4-3, it is likely that essentially all emitted light will be detected by PMTs 3-2; 4-2; 5-2; 3-3; 4-3; 5-3; 3-4; 4-4; and 5-4.

Referring now to FIG. 2, buses cables 18 provide intensity signals from PMTs 24 to a processor 38 which is constructed according to the present invention. Processor 38 includes a plurality of pre-amplifiers collectively referred to by numeral 40, a resistive network 42, a plurality of anode signal processors collectively referred to by numeral 44, a signal subset selector 46, a head processor 48, a summer 47, a first-in-first-out (FIFO) memory 60, and a plurality of buses and data lines linking the aforementioned components together.

A separate pre-amplifier 40 is provided for each PMT 24. Each pre-amplifier 40 receives an intensity signal via a bus 18 and amplifies the intensity signal such that the resulting signal is at a suitable level for analog and digital signal processing. Similarly, a separate anode signal processor 44 is provided for each one of the pre-amplifiers 40. Each anode signal processor 44 is linked via a data line 50 to a separate one of the pre-amplifiers 40 for receiving a corresponding amplified intensity signal. Lines 50, like PMTs 24, can be thought of as being arranged in an array with separate lines referred to herein by their column and row numbers. For example, referring to FIG. 4, line 50$i$ can be referred to as line 8-3 and corresponds to PMT 8-3 (see also FIG. 3).

Figure 4:
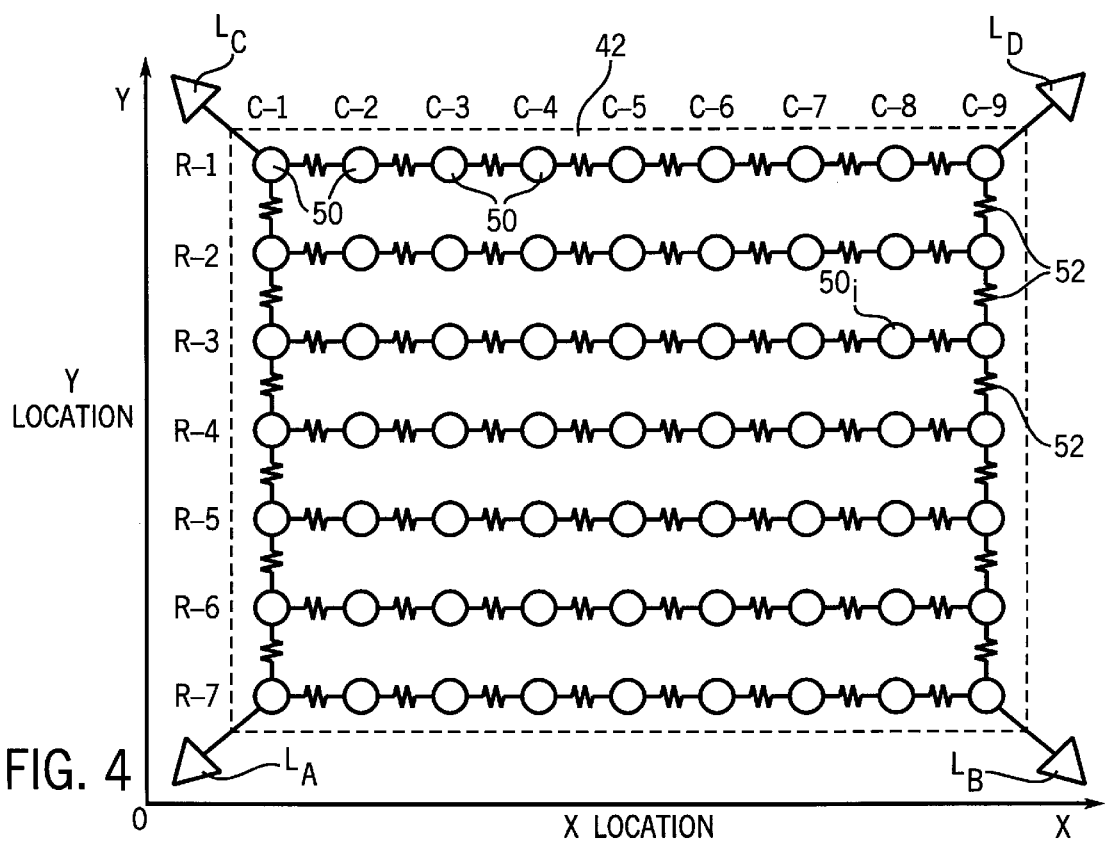
FIG. 4 is a schematic illustration of a resistor network which connects the PMTs of the array illustrated in FIG. 3.

Referring to FIGS. 2 and 4, resistive network 42 includes sixty-eight separate but identical resistors collectively referred to by numeral 52. A separate resistor 52 is provided between each two data lines 50 in adjacent columns. In addition a separate resistor is provided between each two adjacent lines 50 in column C-1 and between each two adjacent lines 50 in column C-9. Four outlet lines $L_A$, $L_B$, $L_C$ and $L_D$ are electrically linked to corner data lines to provide preliminary position signals, A, B, C and D. For example, output line $L_A$ is linked to the lower left-hand corner line 1-7, output line $L_B$ is linked to the lower right-hand corner line 9-7, output line $L_C$ is linked to the upper left-hand corner line 1-1 and output line $L_D$ is linked to the upper right-hand corner line 9-1. X and Y-axis of a Cartesian coordinate system have been provided for indicating position within network 42.

Referring also FIGS. 2, assuming a single intensity signal is provided on the line identified by numeral 50$i$ (i.e. on line 8-3), because there is greater resistance between line 50$i$ and line $L_C$ than there is between line 50$i$ and line $L_D$, the preliminary position signal D on line $L_D$ will have a greater value than the preliminary position signal C on line $L_C$. Similarly, because there is less resistance between line 50$i$ and output line $L_B$ than there is between line 50$i$ and output line $L_A$, the preliminary position signal B on line $L_B$ will be greater than the preliminary position A on line $L_A$. In addition, because there is less resistance between output line $L_D$ and line 50$i$ than there is between output line B and line 50$i$, the preliminary position signal D on line $L_D$ will be greater than the preliminary position signal B on line $L_B$. Moreover, because there is less resistance between output line $L_C$ and line 50$i$ than there is between output line $L_A$ and line 50$i$, the preliminary position signal C on output line $L_C$ will be greater than the preliminary position signal A on output line $L_A$.

Thus, position signals A, B, C and D can be compared to generate a rough estimate of where with respect to the X-Y coordinate system of FIG. 4 an impact point occurs. To generate a relatively more accurate yet still rough position signal using network 42, combinations of signals A, B, C and D can be used. For example, to identify an impact location along the X-axis, the following equation can be solved.

$$X = \frac{B+D}{A+B+C+D} \qquad \text{Eq. 3}$$

Similarly, to identify an impact location along the Y-axis, the following equation can be solved:

$$Y = \frac{C+D}{A+B+C+D} \qquad \text{Eq. 4}$$

Each of lines A, B, C and D are linked to signal subset selector 46 so as to provide preliminary position signals A, B, C and D to selector 46. Selector 46 uses position signals A, B, C, D, E to select a subset of intensity signals provided on lines 50 for digital signal processing by head processor 48. Once the signal subset has been selected, selector 46 provides subset ID signals to the anode signal processors 44 via a data bus 52. The zone ID indicates to processors 44 which of the processors 44 should provide a digital anode signal processor signal (ASP signal) on an output bus 56. Processors 44 are simply integrators which integrate received analog intensity signals and provide the integrated signals as digital ASP signals on bus 56. The ASP signals are received by FIFO memory 60.

Head processor 48 can be any type of digital camera processor, many of which are well known in the art. Head processor 48 is linked to selector 46 via a one way data bus 58. Selector 46 uses bus 58 to indicate to head processor 48 which signal subset should be processed. To this end, selector 46 generates two signals on bus 58. A first signal is the zone ID while a second signal is a time signal $T_1$ indicating the time at which the zone ID was generated. The zone ID and time signal $T_1$ are stored together, the time signals $T_1$ indicating the order in which processor 48 processes zone IDs.

Processor 48 is also linked to FIFO memory 60. After all intensity signals corresponding to an absorbed photon and selected via zone ID on bus 52 have been processed by processors 44 and when head processor 48 is not busy performing other calculations, processor 48 reads ASP signals indicated by the zone ID signal corresponding to the earliest time signal $T_1$. Processor 48 then processes the read ASP signals generating precise impact point signals X1 and Y1 and a precise energy level signal E1.

Figure 5:
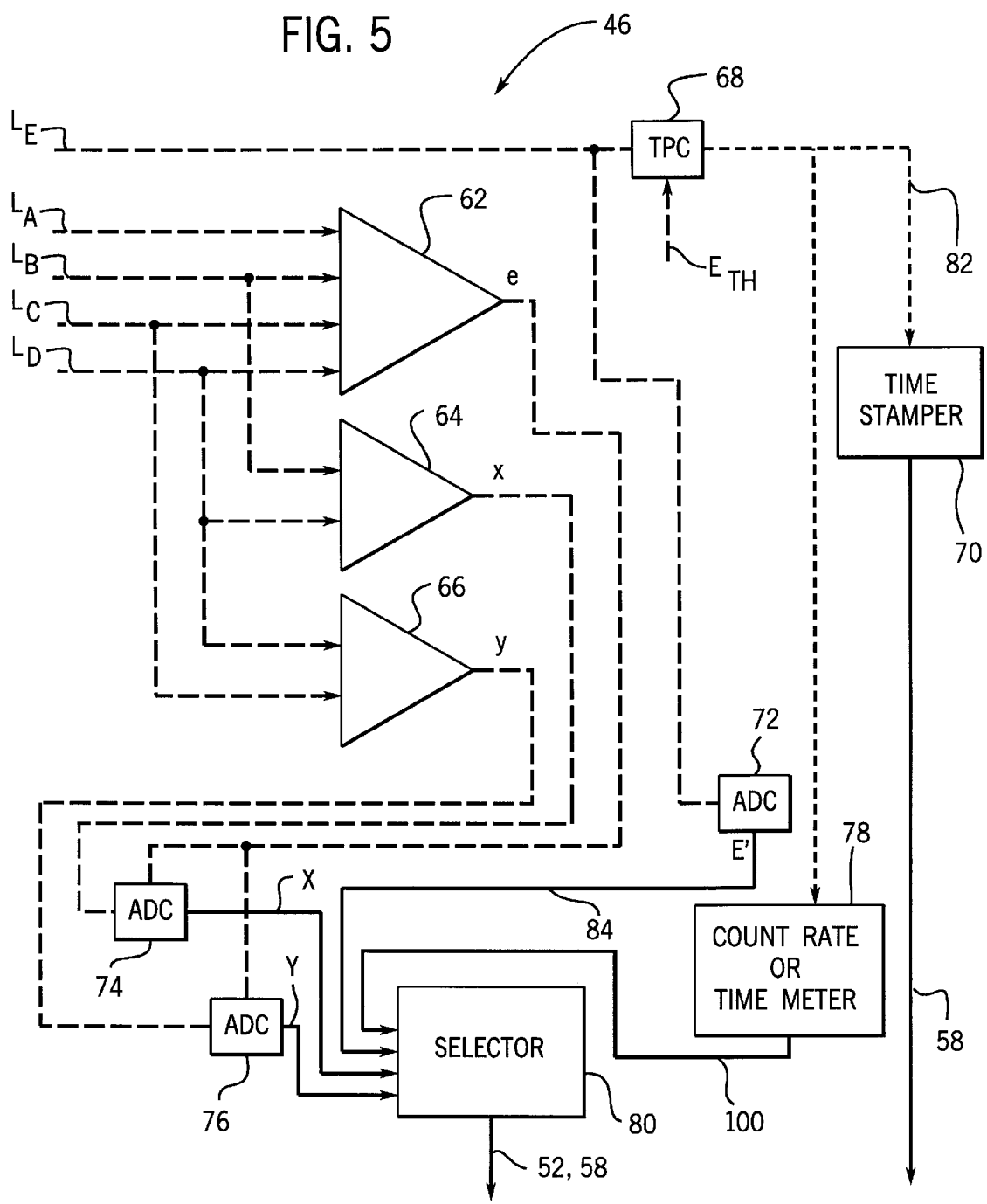
FIG. 5 is a detailed schematic diagram of the signal subset selector of FIG. 2.

For the purposes of this explanation, with respect to FIG. 5, solid lines representing both data lines and data buses will be used to identify lines carrying digital signals, dashed lines representing both data lines and data buses will be used to identify lines and buses transmitting analog data and dotted lines and buses will be used to identify lines and buses transmitting timing logic pulses.

Referring now to FIGS. 2 and 5, in addition to receiving preliminary position signals A, B, C and D and combined intensity signal E, selector 46 also receives or is programmed with a threshold combined intensity signal $E_{TH}$. Selector 46 uses its received signals to generate both a zone ID on line 52 and on bus 58 and to generate the time signal $T_1$ on bus 58. To this end, selector 46 includes first, second and third summing amplifiers, 62, 64, 66 respectively, a timing pick off circuit (TPC) 68, a time stamper 70, first, second and third analog to digital converters (ADC), 72, 74, 76 respectively, a count rate or time meter 78 and a selector 80.

Combined intensity signal E is provided to TPC 68. Circuit 68 compares combined intensity signal E and threshold intensity signal $E_{TH}$ and, when combined intensity signal E exceeds threshold signal $E_{TH}$, provides a timing event pulse as an output on line 82.

The timing event pulse on line 82 is provided to time stamper 70 which indicates the precise time at which combined intensity signal E exceeded the threshold signal $E_{TH}$. In addition, combined intensity signal E is also provided to first ADC 72 which converts the analog signal E to a digital combined intensity signal E' on data line 84.

Amplifiers 62, 64 and 66 and ADCs 74 and 76 cooperate to perform Equations 3 and 4 above thereby identifying a rough impact point location. To this end, preliminary position signals A, B, C and D are all provided as inputs to amplifier 62 which forms analog signal e according to the following equation:

$$e = A+B+C+D \qquad \text{Eq.5}$$

Similarly, preliminary position signals B and D are provided to summing amplifier 64 which generates a signal x by solving the following equation:

$$x = B+D \qquad \text{Eq.6}$$

Also, preliminary position signals C and D are provided to amplifier 66 which generates signal y according to the following equation:

$$y = C + D \quad \text{Eq. 7}$$

The x and y signals are provided to the inputs to ADCs 74 and 76, respectively, and signal e is provided as reference voltages to each ADC 74 and 76 so that the outputs of ADCs are normalized positions according to Equations 3 and 4 above.

Selector 80 receives signals X, Y and E' and uses those signals to identify an optimal signal subset or zone ID for detailed processing by head processor 48. To this end, although not illustrated, selector 80 preferably includes a look up table which can be used to identify the optimal zone ID. For example, referring again to FIG. 3, assuming the impact point of a photon is centrally located with respect to PMT 4-3, the look up table might identify a signal subset including signals corresponding to PMTs 3-2; 4-2; 5-2; 3-3; 4-3; 5-3; 3-4; 4-4; and 5-4.

In addition to simply identifying a signal subset, in a preferred apparatus, selector 80 is also capable of modifying signal subset size. For example, referring again to FIG. 3, where an impact point is centrally located with respect to PMT 4-3 and the combined intensity signal E is relatively high, instead of selecting only nine PMTs (i.e. the PMTs directly surrounding PMT 4-3), selector 80 may select the larger number of PMTs including some or all PMTs which are within two PMTs of PMT 4-3.

Figure 6:
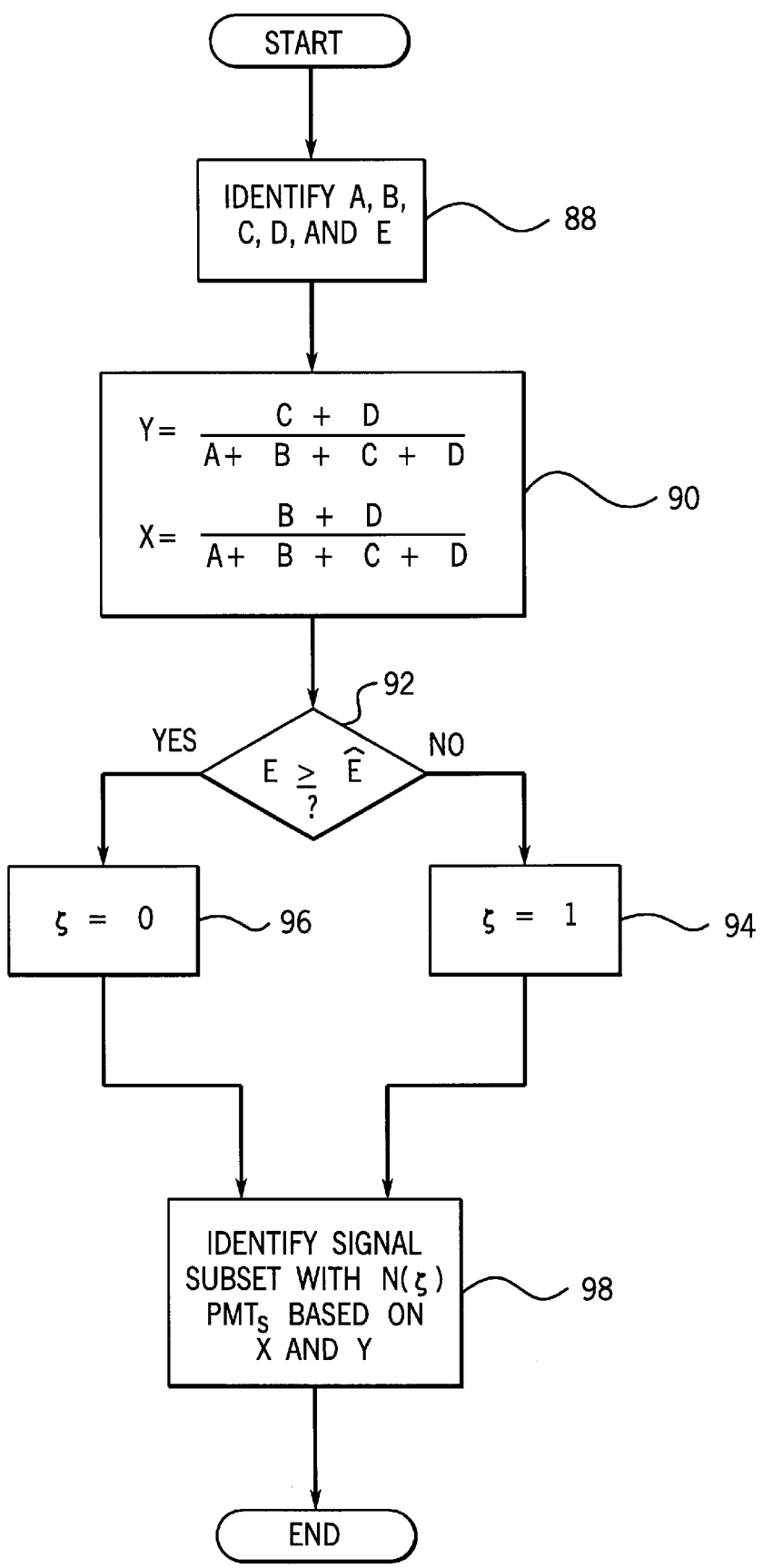
FIG. 6 is a flowchart illustrating operation of the signal subset selector of FIG. 5.

To this end, referring to FIG. 6, a preferred inventive method is illustrated. Referring also to FIGS. 2 and 5, beginning at block 88, resistor network 42 generates preliminary position signals A, B, C and D and summer 47 generates combined intensity signal E. At block 90, amplifiers 62, 64 and 66 and ADCs 74 and 76 cooperate to identify position signals X and Y according to Equations 3 and 4 above. At decision block 92, combined intensity signal E is compared to a peak intensity signal Ê. Where combined intensity signal E is less than peak intensity signal Ê, a variable $\zeta$ is set equal to one at block 94 indicating that a relatively small signal subset can be selected. However, if combined intensity signal E is greater than or equal to peak intensity signal Ê, variable $\zeta$ is set equal to zero at block 96 indicating that a relatively larger signal subset should be selected for further processing. At block 98 selector 80 identifies the signal subset based on position signals X and Y, the selected subset having $N(\zeta)$ intensity signal members.

In addition to modifying signal subset size as a function of the combined intensity signal E, the selector may also modify signal subset size as a function of the rate at which photons are being absorbed by the scintillation crystal 22. Where the count rate CR is extremely high, in order to avoid dead time and pile up, selector 80 should select a relatively small number of intensity signals for each signal subset. However, where count rate CR is relatively low, selector 80 can select a larger signal subset. To this end, referring again to FIG. 5, the timing logic pulse on line 82 is also provided to either a count rate meter or a time meter 78. Where element 78 is a count rate meter, each time an absorbed photon generates a combined intensity signal E which exceeds threshold intensity signal $E_{TH}$, meter 78 increases a count rate variable CR by one. The count rate variable is provided to selector 80 via a bus 100.

Figure 7:
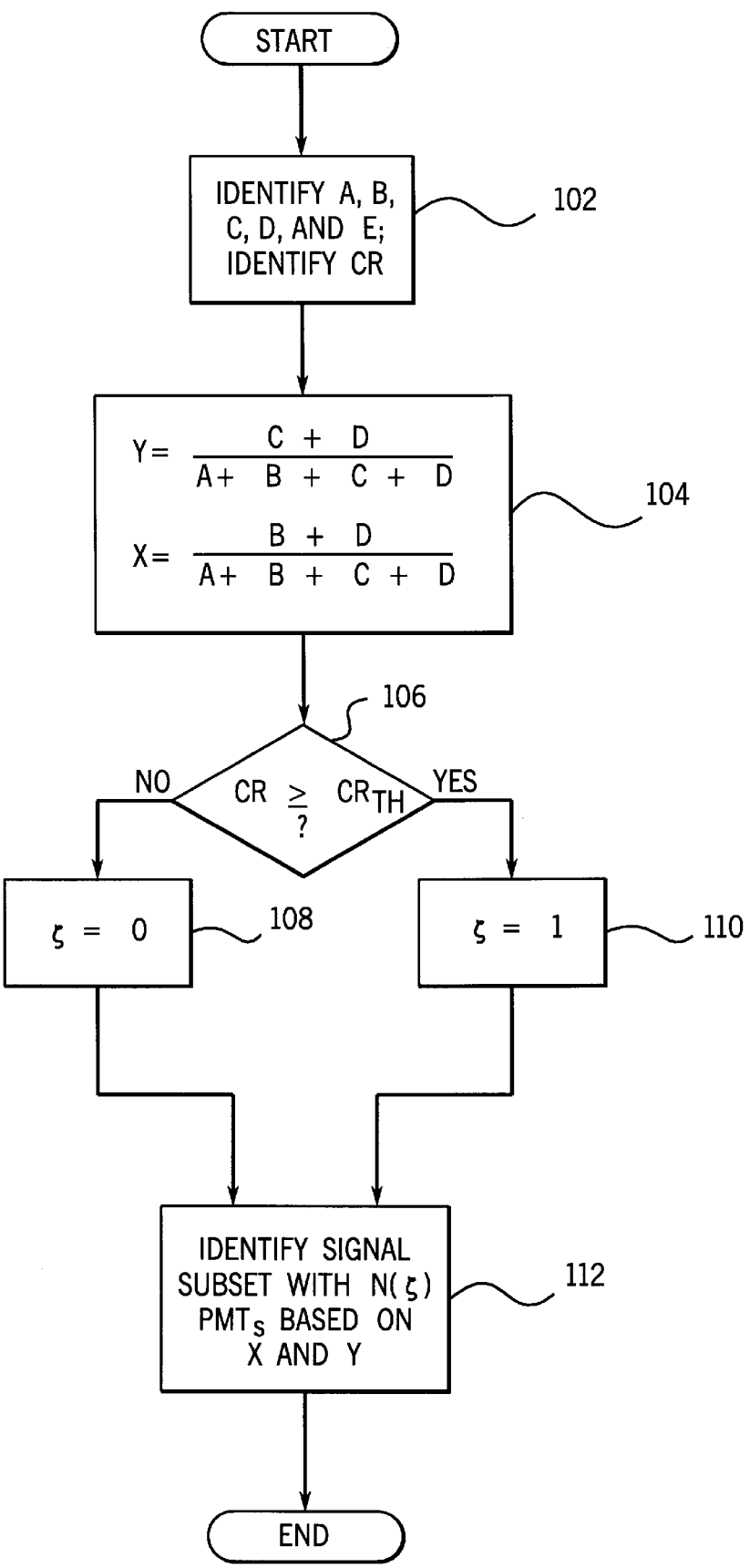
FIG. 7 is similar to FIG. 6, albeit illustrating slightly different operation of the selector.

Referring now to FIG. 7, a preferred method whereby selector 80 modifies signal subset size as a function of count rate CR is illustrated. Referring also to FIGS. 2, 4, and 5, at block 102 resistive network 42 generates preliminary position signals A, B, C and D and summer 47 generates combined intensity signal E. Circuit 68 compares combined intensity signal E with threshold intensity signal $E_{TH}$ and generates a timing pulse on line 82 each time combined intensity signal E exceeds or is equal to threshold intensity signal $E_{TH}$. Meter 78 counts each separate timing pulse and generates count rate variable CR on line 100. At block 104 amplifiers 62, 64 and 66 and ADCs 74 and 78 cooperate to generate X and Y position signals according to Equations 3 and 4 above. Signals X and Y are provided to selector 80. At decision block 106 selector 80 compares count rate signal CR to a threshold count rate value $CR_{TH}$. When count rate signal CR is less than the threshold count rate $CR_{TH}$, variable $\zeta$ is set equal to zero indicating that the count rate is relatively low and therefore a relatively large signal subset can be selected. However, when count rate signal CR is greater than or equal to threshold count rate value $CR_{TH}$, variable $\zeta$ is set equal to one indicating that count rate CR is relatively high and therefore a relatively small signal subset should be selected. At process block 112, selector 46 selects a signal subset having $N(\zeta)$ intensity signal members based on position signals X and Y.

Referring again to FIG. 5, where component 78 is a time meter, instead of generating a count rate signal CR on line 100, meter 78 generates a timing signal $\Delta T$ indicating the duration of the period between the most recent consecutive absorbed photons. When timing signal $\Delta T$ is relatively short, in order to avoid dead time and pile up, selector 80 reduces signal subset size. However, where timing signal $\Delta T$ is relatively long, head processor 48 (see FIG. 2) will have excessive processing time and therefore selector 80 increases signal subset size.

Figure 8:
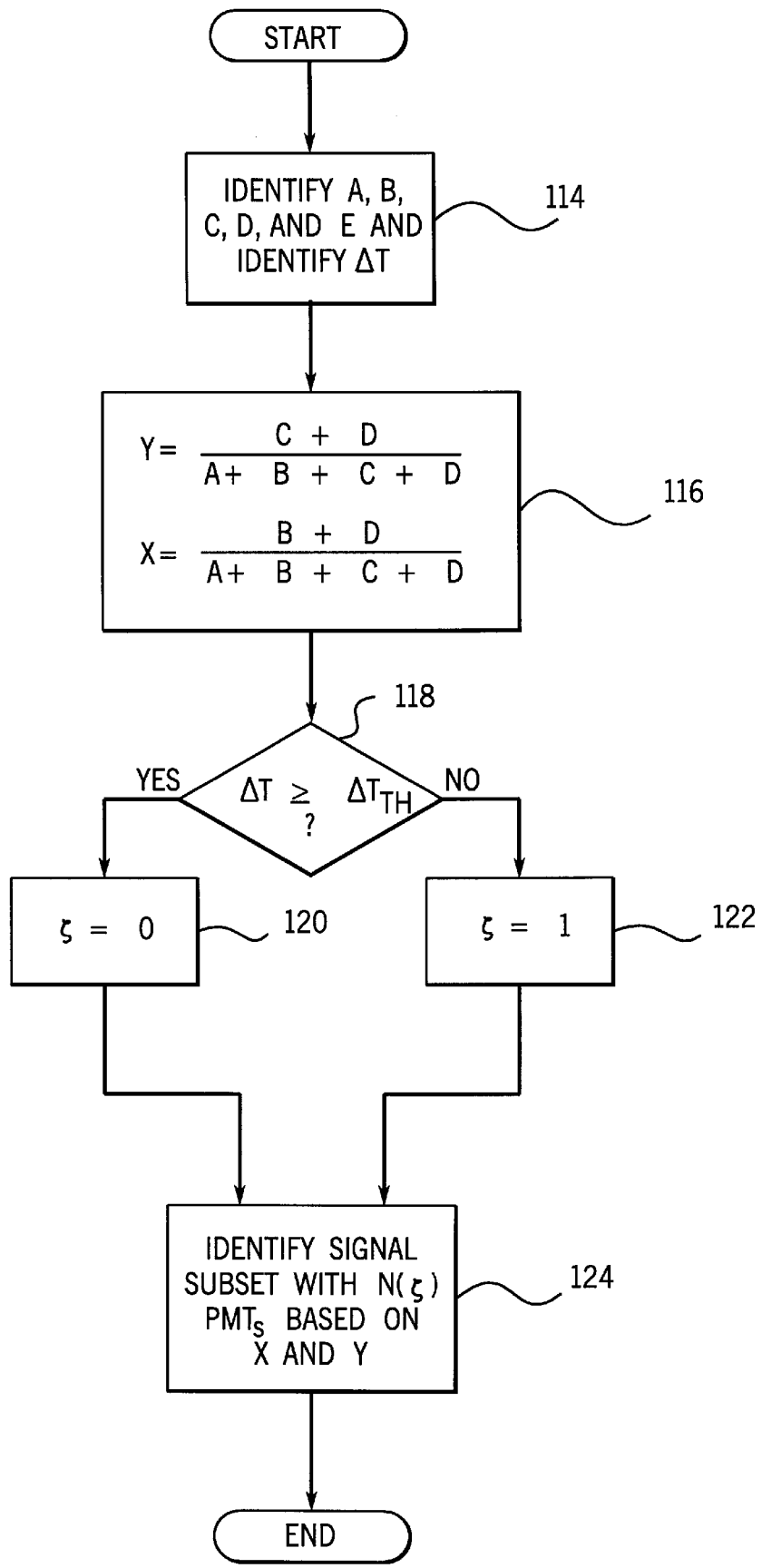
FIG. 8 is also similar to FIG. 6, albeit illustrating slightly different operation of the selector.

Referring now to FIG. 8, a method whereby selector 80 modifies signal subset size as a function of timing signal $\Delta T$ is illustrated. Referring also to FIGS. 2, 4 and 5, at block 114 resistive network 42 generates preliminary position signals A, B, C and D and summer 47 generates combined intensity signal E. Circuit 68 receives combined intensity signal E and compares signal E with threshold intensity $E_{TH}$. Each time combined intensity signal E exceed threshold intensity signal $E_{TH}$, circuit 68 generates a timing pulse on line 82 which is provided to time meter 78. Time meter 78 tracks pulses on line 82 and generates timing signal $\Delta T$ indicating the time between most recent consecutive timing pulses on line 82. Timing signal $\Delta T$ is provided on line 100 to selector 80.

Amplifiers 62, 64, 66 and ADCs 74 and 76 cooperate to generate position signals X and Y according to Equations 3 and 4 above at block 116. At block 118, selector 80 compares timing signal $\Delta T$ to a threshold timing signal $\Delta T_{TH}$. Where timing signal $\Delta T$ is less than threshold timing signal $\Delta T_{TH}$, selector 80 sets variable $\zeta$ equal to one indicating that a relatively small amount of time occurred between consecutive timing pulses and therefore a relatively small signal subset should be selected. Where timing signal $\Delta T$ is greater than or equal to threshold timing signal $\Delta T_{TH}$, selector 80 sets variable $\zeta$ equal to zero indicating that a relatively large signal set should be selected. At block 124 selector 80 identifies the signal subset including $N(\zeta)$ intensity signal members based on X and Y position signals.

B. Results

FIGS. 9 through 12 show the ability of a fast analog Anger processor to correctly identify a rough estimate of the impact point at very high count rates. The data illustrated was generated using Monte Carlo calculations which are well known in the art. The calculations were performed for 511 keV gammas on a 59 cm×46 cm×1.8 cm NaI crystal coupled to ninety-four 5 cm round PMTs. The PMT signals to selector 46 were filtered using a 10 nano-second gaussian filter and an attenuated twenty-eight nano-second delay line clipping circuit. PMTs with a signal greater than þ1.25% of the summed signal for a 511 keV gamma were included in the position calculation using an Anger analog camera. Only events with analog energy levels between ♭330 keV and ♭600 keV were accepted. FIGS. 9 through 12 show the results for count rates in the detector head of 6 MHz. Similar data (not illustrated) was generated for count rates of 1, 4, 8 and 10 MHz.

Figure 9:
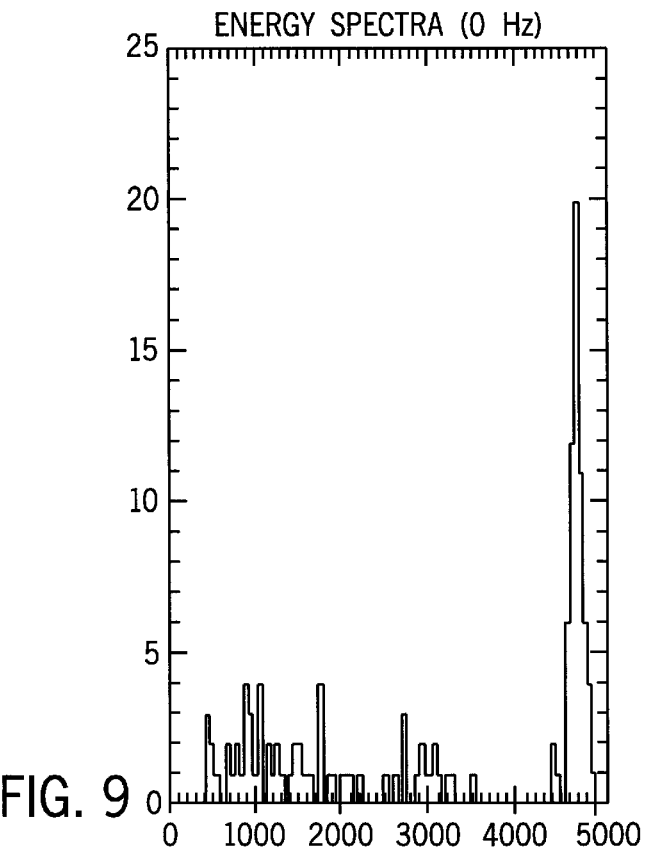
FIG. 9 is a graph illustrating photon energy spectra.
Figure 10:
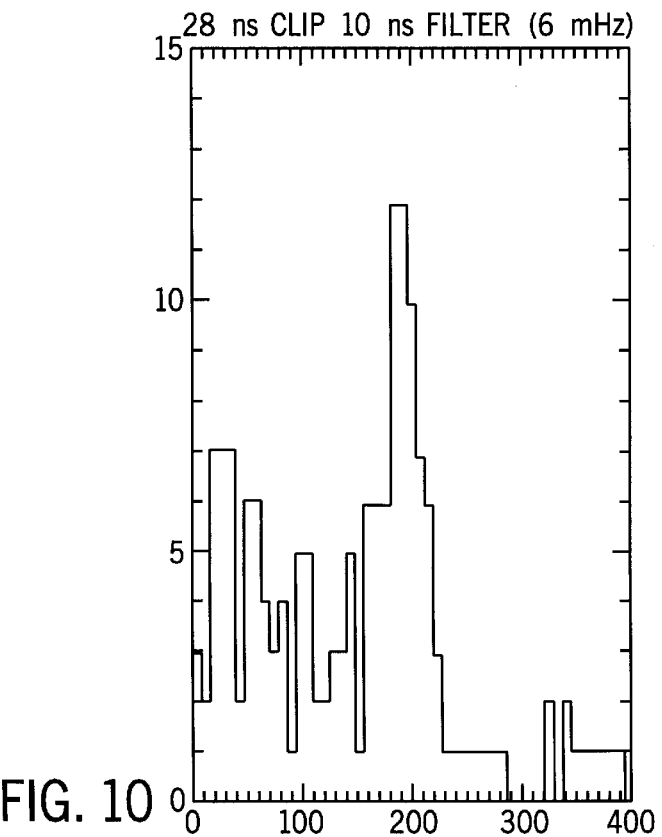
FIG. 10 is a graph illustrating photon energy spectra corresponding to the spectra of FIG. 9 generated by a fast analog Anger processor.
Figure 11:
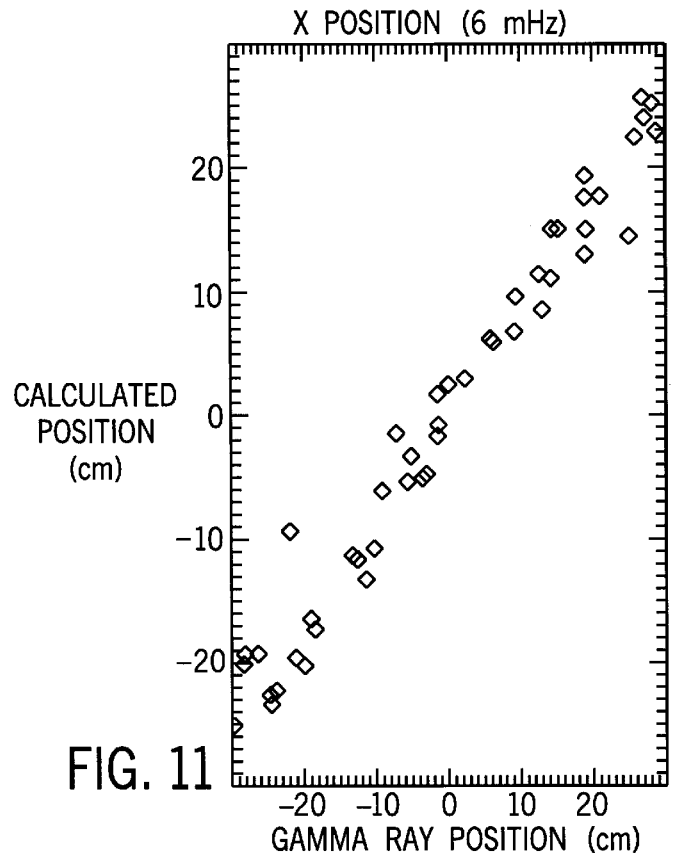
FIG. 11 is a graph illustrating the relationship between actual photon impact location and location calculated using a fast analog processor along an x-axis.
Figure 12:
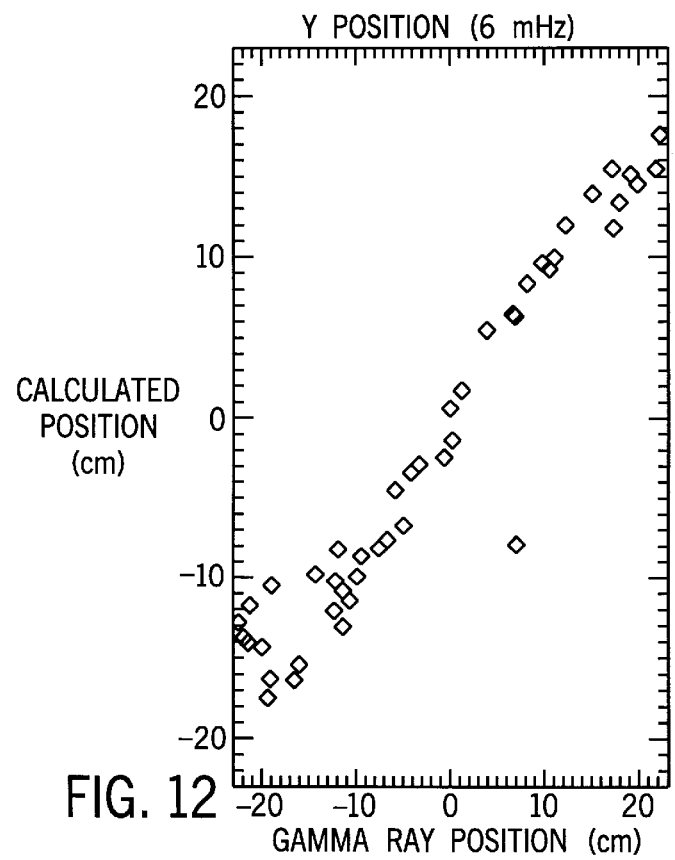
FIG. 12 is similar to FIG. 11, albeit along a y-axis.

FIG. 9 illustrates the energy spectra for the gamma rays with no pileup, no clipping, and an infinitely long integration time. FIG. 10 illustrates the energy spectra generated using a fast analog Anger processor. FIG. 11 illustrates relationship between the actual gamma ray interaction position along an X-axis (see FIG. 4), and the position calculated by the fast analog Anger processor circuit. Similarly, FIG. 12 illustrates the relationship between the actual gamma ray interacting position along the Y-axis (see FIG. 4) and the position calculated by the Anger processor. For most events, the analog circuit is able to calculate the impact point location to the accuracy required (e.g. less than the distance between PMTs) for determining a zone ID to be used by the digital camera circuit.

There are some events with a large error in the position calculated by the fast analog Anger circuit. These events correspond to gamma rays which deposit a small signal in the NaI and pile up with another event such that the energy measured by the analog circuit is within the acceptance window. These piled up events will be rejected by an energy window placed on the data from the digital camera circuit.

It should be understood that the methods and apparatuses described above are only exemplary and do not limit the scope of the invention, and that various modifications could be made by those skilled in the art that would fall under the scope of the invention. For example, while the invention is described wherein the size of a zone ID may be dependent on any one of count rate, time between consecutive events and combined intensity signal level, clearly, more complex algorithms wherein two or more of these factors are used together to determine zone ID size are contemplated. In addition, there could be other factors which might be used to modify zone ID size. Moreover, while one type of digital processor has been incorporated herein by reference, the invention could be used with other digital processors. Furthermore, while the fast and inexpensive processor is preferably an analog Anger processor, other types of fast processors might be used instead. Moreover, the inventive method can be used with two scintillation cameras to perform coincident detection. In fact, because more calculations are required for coincident detection, the present invention is particularly suited for this purpose.

To apprise the public of the scope of this invention, I make the following claims:

I claim:

1. An apparatus to be used with a gamma camera system, the system including a camera, the camera including a scintillation crystal having opposite impact and emitter surfaces and a plurality of light detecting photo multiplier tubes (PMTs), the tubes arranged in an array adjacent the emitter surface, the crystal positionable adjacent an imaging area such that some of the photons from within the imaging area impact the impact surface, each photon which impacts the impact surface impacting at a specific impact point, each time a photon impacts the crystal, the crystal emitting light from the emitter surface adjacent the impact point, the PMTs sensing emitted light and generating intensity signals corresponding to each impacting photon, the apparatus for selecting a subset of intensity signals corresponding to each impacting photon for use in identifying a corresponding impact point, the apparatus comprising:

(a) a first processor using the intensity signals to generate at least one general position signal indicating the general location of an impact point;

(b) a selector using the general position signal to select a PMT subset, intensity signals corresponding to the subset being a signal subset; and (c) a second processor processing the signal subset to identify the impact point and generate a precise position signal indicating the impact point.

2. The apparatus of claim 1 wherein the first processor is an analog processor and the general position signal is an analog position signal and the second processor is a digital processor.

3. The apparatus of claim 1 further including a determiner which monitors intensity signals and generates a characteristic signal indicating at least one characteristic of the intensity signals and, wherein, prior to selecting the PMT subset, the selector identifies the number of PMTs in the subset as a function of the characteristic signal.

4. The apparatus of claim 3 wherein the analog processor includes the determiner and the characteristic signal is an analog intensity signal indicating the combined intensity of all of the intensity signals corresponding to an absorbed photon and, wherein, the selector increases the number of PMTs in the subset as the level of the combined intensity signal increases.

5. The apparatus of claim 3 wherein the determiner is a count rate meter for counting the number of photons absorbed by the crystal per unit time thereby generating a count rate signal and, wherein, the selector increases the number of PMTs in the subset as the count rate decreases.

6. The apparatus of claim 3 wherein the determiner is a timer for measuring the time period between consecutive photons absorbed by the crystal generating a time signal and, wherein, the selector increases the number of PMTs in the subset as the value of the time signal increases.

7. A method to be used with a gamma camera system, the system including a camera, the camera including a scintillation crystal having opposite impact and emitter surfaces and a plurality of light detecting photo multiplier tubes (PMTs), the tubes arranged in an array adjacent the emitter surface, the crystal positionable adjacent an imaging area such that some of the photons from within the imaging area impact the impact surface, each photon which impacts the impact surface impacting at a specific impact point, when a photon impacts the crystal, the crystal emitting light from the emitter surface adjacent the impact point, the PMTs sensing emitted light and generating intensity signals corresponding to each impacting photon, the method for selecting a subset of intensity signals corresponding to each impacting photon for use in identifying a corresponding impact point, the method comprising the steps of:

(a) generating at least one general position signals as a function of the intensity signals, the general position signal indicating an impact point general location;

(b) selecting a PMT subset as a function of the general position signal, intensity signals corresponding to the subset being a signal subset; and (c) processing the signal subset to identify the impact point and generate a precise position signal indicating the impact point.

8. The method of claim 7 wherein the step of generating includes generating analog position signals and the step of processing includes converting the signal subset form analog signals to digital signals and processing the digital signals.

9. The method of claim 7 further including the steps of generates an analog intensity signal indicating the combined intensity of all of the intensity signals corresponding to an absorbed photon and, prior to the selecting step, determining the number of PMTs in the subset as a function of the combined intensity signal.

10. The method of claim 7 further including the steps of counting the number of photons absorbed by the crystal per unit time thereby generating a count rate signal and, prior to selecting the PMT subset, determining the number of PMTs in the subset as a function of the count rate signal.

11. The method of claim 7 further including the steps of measuring the time period between consecutive photons absorbed by the crystal to generate a time signal and, prior to selecting the PMT subset, determining the number of PMTs in the subset as a function of the time signal.

* * * * *